(12) United States Patent
Zhao et al.

(10) Patent No.: US 12,276,875 B2
(45) Date of Patent: Apr. 15, 2025

(54) DISPLAY APPARATUS AND DISPLAY HOLDING DEVICE THEREOF

(71) Applicant: Wistron Corporation, New Taipei (TW)

(72) Inventors: Chun-Lei Zhao, New Taipei (TW); Yao-Chen Yang, New Taipei (TW); Chia-Jang Chen, New Taipei (TW); Chih-Chou Chou, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 18/463,493

(22) Filed: Sep. 8, 2023

(65) Prior Publication Data

US 2025/0020952 A1    Jan. 16, 2025

(30) Foreign Application Priority Data

Jul. 12, 2023   (CN) .......................... 202310854941.0

(51) Int. Cl.
   *G02B 6/43*     (2006.01)
   *G02F 1/1333*   (2006.01)
   *G02F 1/1335*   (2006.01)

(52) U.S. Cl.
   CPC .... *G02F 1/13332* (2021.01); *G02F 1/133314* (2021.01); *G02F 1/133553* (2013.01); *G02F 1/13338* (2013.01)

(58) Field of Classification Search
   CPC ........... G02F 1/13332; G02F 1/133314; G02F 1/133322; G02F 1/133325;

(Continued)

(56) References Cited

U.S. PATENT DOCUMENTS 7,881,614 B2 * 2/2011 Ruiz ..................... H04B 10/801
                                                       398/131
2003/0091301 A1 * 5/2003 Lee ....................... G02B 6/4283
                                                       385/89

(Continued)

FOREIGN PATENT DOCUMENTS

CN    106559522 A  *  4/2017
CN    216352273 U  *  4/2022

(Continued)

OTHER PUBLICATIONS

Examination report dated Apr. 22, 2024, listed in related Taiwan patent application No. 112126791.

*Primary Examiner* — Hoan C Nguyen
(74) *Attorney, Agent, or Firm* — McClure, Qualey & Rodack, LLP

(57) ABSTRACT

A display apparatus and a display holding device thereof are provided. The display holding device includes a front frame and a rear plate. The front frame includes an edge portion, a top portion, a containing portion, an extending portion, and a holding portion. The top portion is connected to the edge portion. An end of the containing portion is connected to the edge portion, and the containing portion is adapted to contain an optical transceiver module. The extending portion adapted to contain a panel module is connected to an another end of the containing portion and extends toward a direction away from the edge portion. The holding portion adapted to contain a light-transmissive element is between the containing portion and the extending portion. The rear plate adapted to contain an optical film module is connected to the front frame. Therefore, a width of the front frame can be further reduced.

20 Claims, 11 Drawing Sheets

(58) Field of Classification Search
CPC ......... G02F 1/133328; G02F 1/133331; G02F 1/133553; G02F 1/13338; G06F 3/0421; G06F 3/042

See application file for complete search history.

(56) References Cited

U.S. PATENT DOCUMENTS

| | | | | |
|---|---|---|---|---|
| 2010/0079382 A1* | 4/2010 | Suggs | .................. | G06F 3/0421 |
| | | | | 345/173 |
| 2012/0019483 A1* | 1/2012 | Chiang | ................ | G06F 3/0428 |
| | | | | 345/175 |
| 2020/0106525 A1* | 4/2020 | Komiyama | ........ | H04B 10/1143 |

FOREIGN PATENT DOCUMENTS

| | | | |
|---|---|---|---|
| CN | 216388051 U | * | 4/2022 |
| CN | 219066125 U | | 5/2023 |
| JP | 2008292838 A | * | 12/2008 |

* cited by examiner

DISPLAY APPARATUS AND DISPLAY HOLDING DEVICE THEREOF

CROSS-REFERENCE TO RELATED APPLICATION

This non-provisional application claims priority under 35 U.S.C. § 119(a) to patent application No. 202310854941.0 filed in China on Jul. 12, 2023, and the entire contents of which are hereby incorporated by reference.

BACKGROUND

Technical Field

The instant disclosure relates to a display apparatus and a display holding device thereof, particularly a display apparatus with a narrow outer frame and a display holding device of the display apparatus.

Related Art

Currently, a variety of display devices with different specifications suitable for different purposes are available for consumers to select. Upon selecting from such display devices, in addition to the functions and specifications of the display devices, consumers often intuitively consider the appearance of the display devices and take it as one of the considerations for whether to purchase or not.

SUMMARY

Taking an infrared (IR) touch display as an example, an IR touch module is arranged around a display panel, such as, the IR touch module is arranged to surround an outer frame of a display device. Hence, the IR touch module with a certain width (which will occupy a certain space) should be arranged around the outer frame of the display device, but in the meantime, the appearance of the display device should also be taken into consideration. In view of this, how to provide an IR touch display device (or an apparatus comprising the IR touch display device) with a more attractive appearance for consumers, and even be favored by consumers, has become one of the problems to be solved.

Furthermore, the IR touch display device (or the apparatus comprising the IR touch display device) on the market cannot provide narrower outer frames mostly because of the assembling arrangements between panel components, IR touch modules, and frame elements. Therefore, for a display device with a wide outer frame known to the inventor, in addition to the appearance of the display device with the wide outer frame that is difficult to be accepted or even favored by consumers, the display device also has some shortcomings such as the components of the display device or the apparatus are too many, the assembly steps for the display device or the apparatus are trivial and time-consuming, the overall weight of the display device or the apparatus is relatively heavier, and the image-display area of the display device is relatively smaller.

Accordingly, in some embodiments, a display holding device is provided, wherein the display holding device comprises a front frame and a rear plate. The front frame comprises an edge portion, a top portion, a containing portion, an extending portion, and a holding portion. The top portion is connected to the edge portion. An end of the containing portion is connected to the edge portion, and the containing portion is adapted to contain an optical transceiver module. The extending portion is connected to an another end of the containing portion and extends toward a direction away from the edge portion, and the extending portion is adapted to contain a liquid crystal module. The holding portion is between the containing portion and the extending portion, and the holding portion is adapted to contain a light-transmissive module. The rear plate is connected to the front frame, and the rear plate is adapted to contain an optical film module.

Moreover, in some embodiments, a display apparatus is further provided, wherein the display apparatus comprises a light-transmissive module, an optical transceiver module, a liquid crystal module, an optical film module, a front frame, and a rear plate. The front frame comprises an edge portion, a top portion, a containing portion, an extending portion, and a holding portion. The top portion is connected to the edge portion. An end of the containing portion is connected to the edge portion, and the containing portion contains the optical transceiver module. The extending portion is connected to an another end of the containing portion and extends toward a direction away from the edge portion, and the extending portion contains the liquid crystal module. The holding portion is between the containing portion and the extending portion, and the holding portion contains the light-transmissive module. The rear plate is connected to the front frame, and the rear plate contains the optical film module.

According to some embodiments, the edge portion, the top portion, the extending portion, and the holding portion are integrally formed as a one-piece member.

According to some embodiments, the optical transceiver module comprises a module body and an optical transceiver portion. The optical transceiver portion is on the module body and adapted to emit or receive a light.

According to some embodiments, the light emitted or received by the optical transceiver portion is substantially parallel to the light-transmissive module.

According to some embodiments, the light emitted or received by the optical transceiver portion is substantially perpendicular to the light-transmissive module.

DETAILED DESCRIPTION

Figure 1:
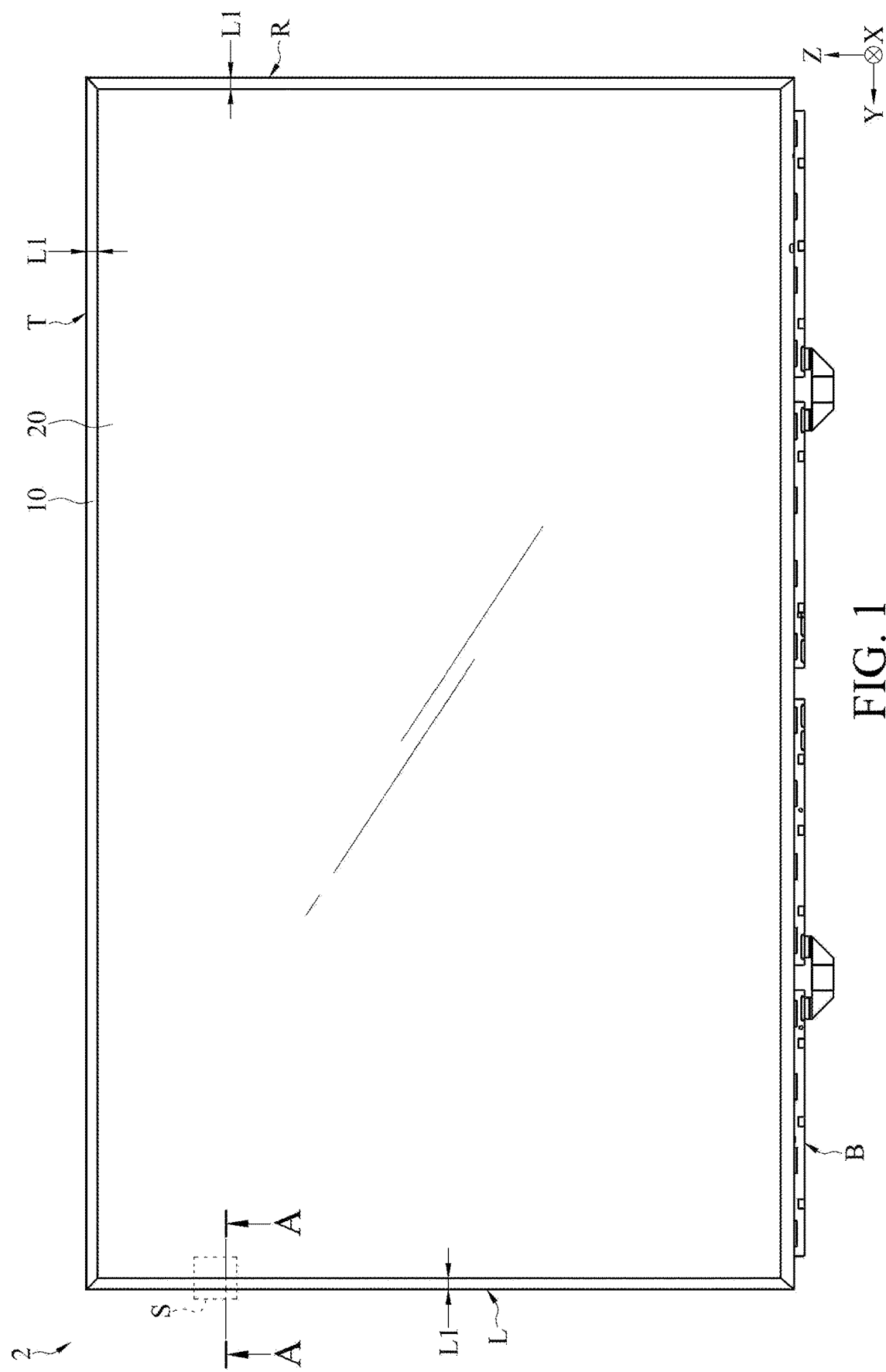
FIG. 1 illustrates a schematic perspective view of a display apparatus and a display holding device of the display apparatus according to some embodiments.
Figure 2A:
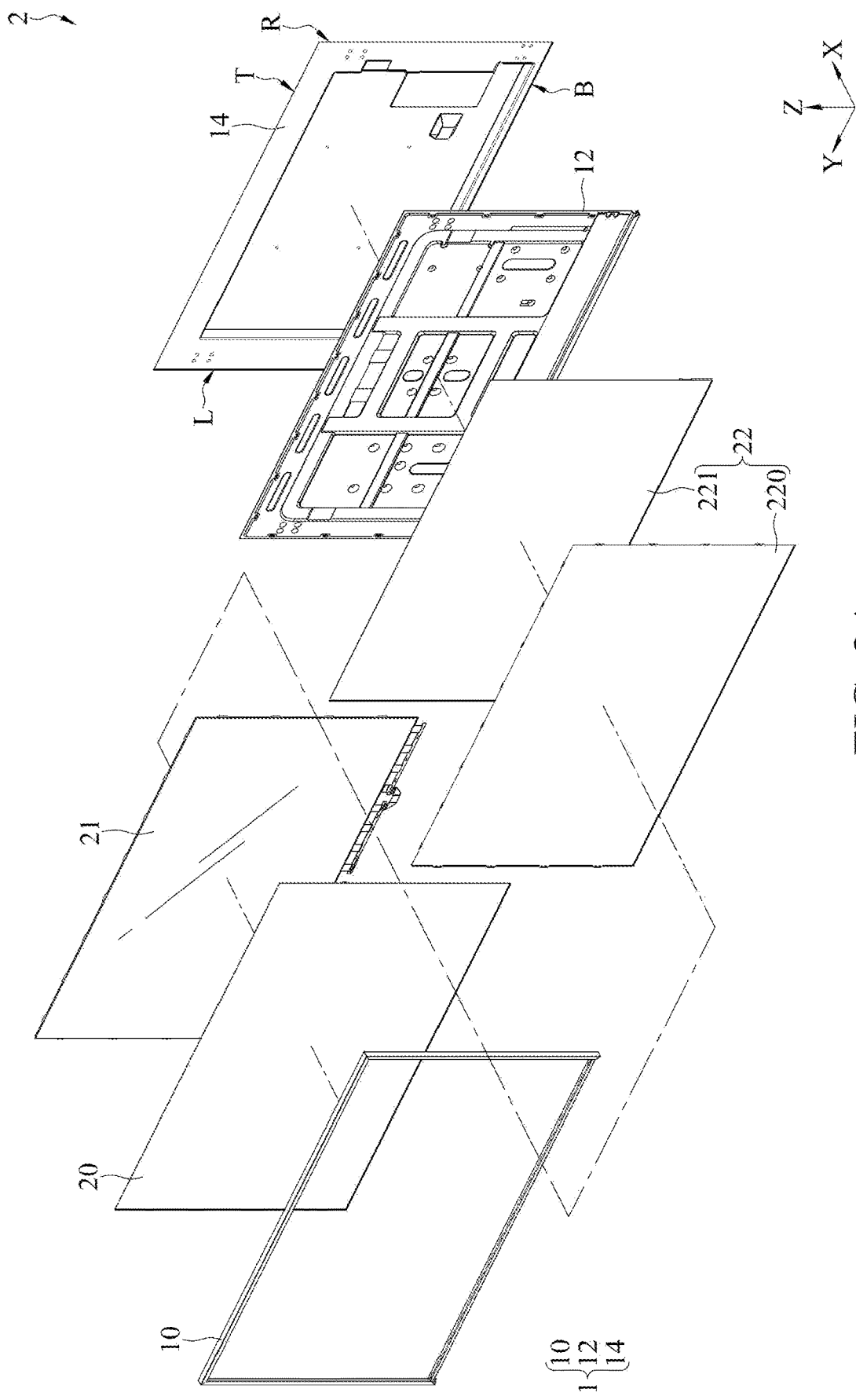
FIG. 2A illustrates an exploded view of the display apparatus and the display holding device of the display apparatus shown in FIG. 1.
Figure 2B:
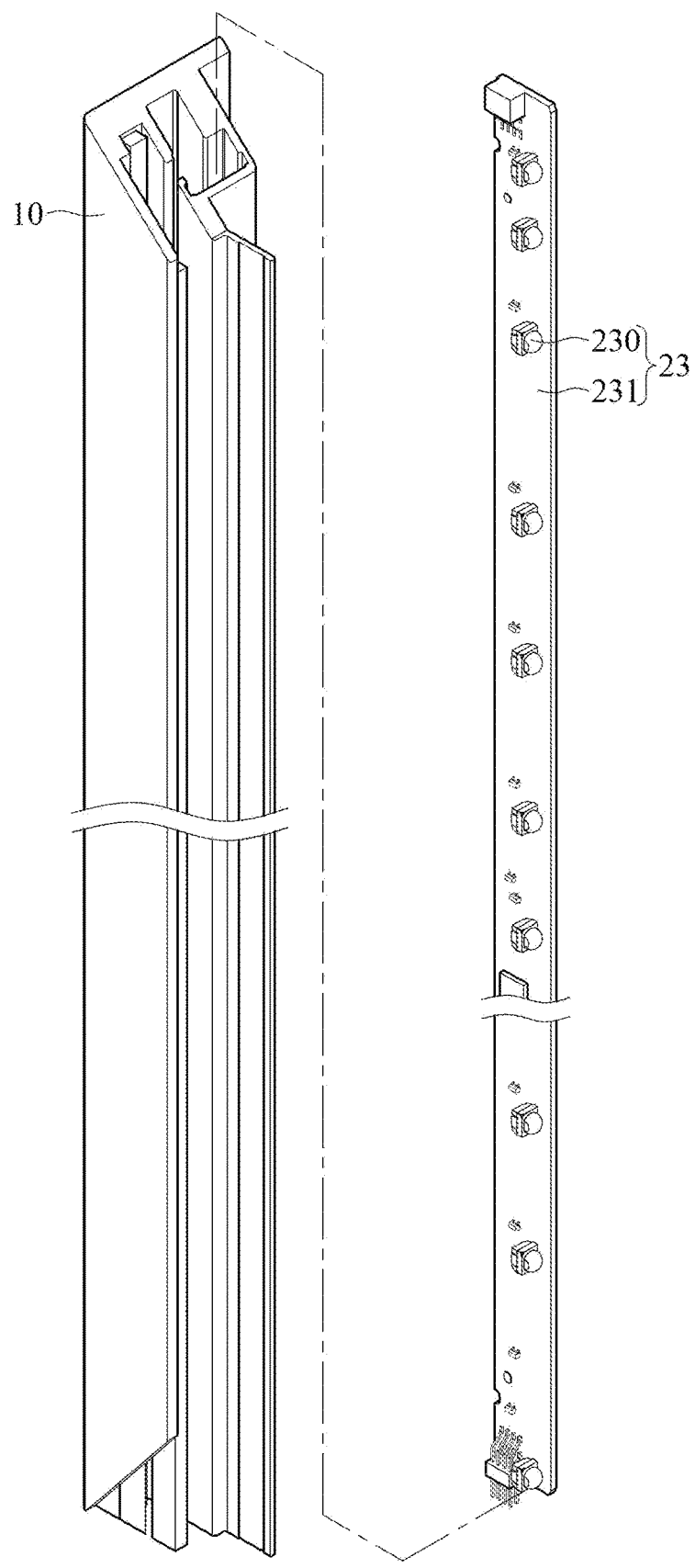
FIG. 2B illustrates a partial exploded view of a front frame of the display apparatus and the display holding device of the display apparatus shown in FIG. 1.
Figure 3A:
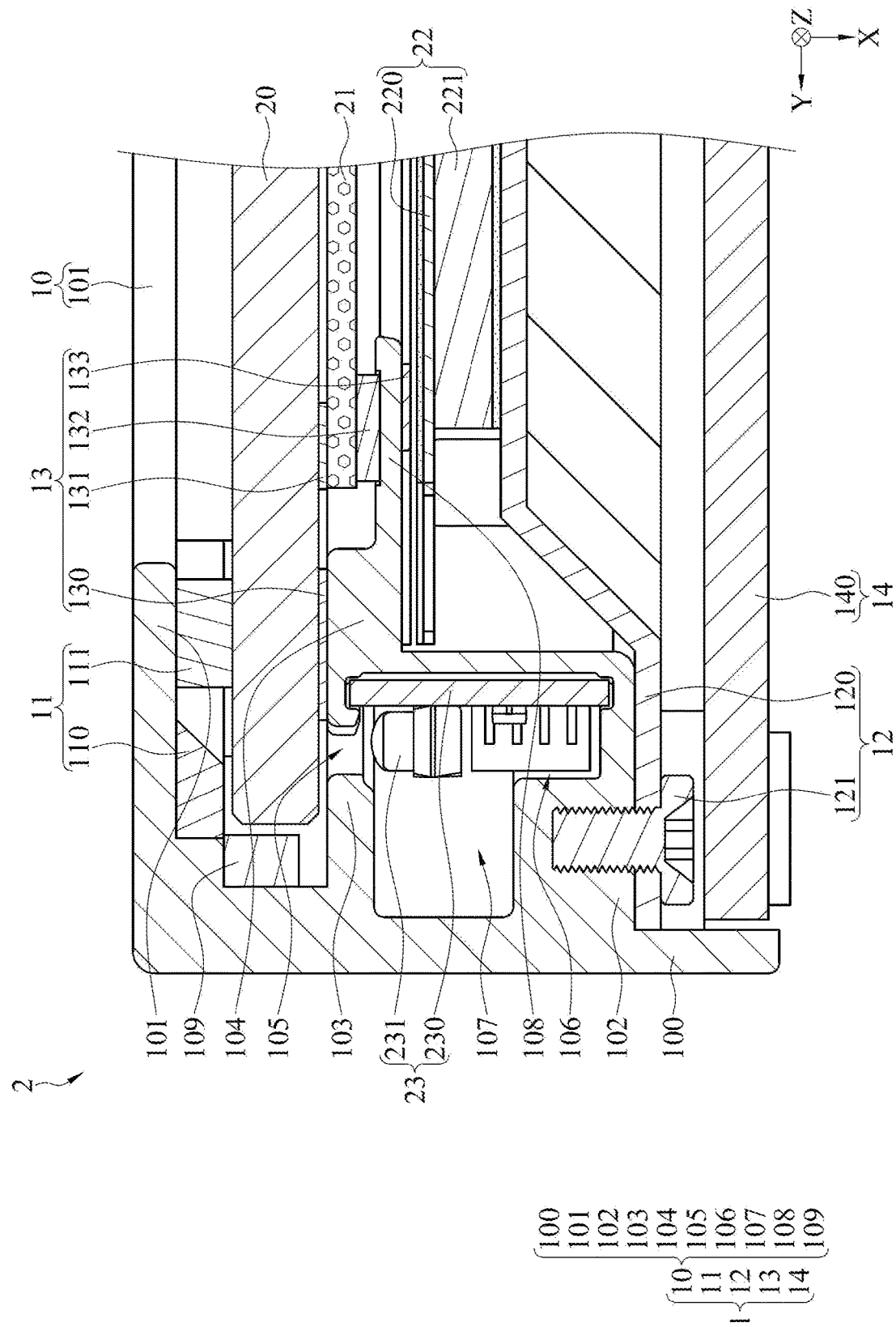
FIG. 3A illustrates an enlarged partial perspective view of a display apparatus and a display holding device of the display apparatus according to a first embodiment, where the section S along the line A-A shown in FIG. 1 is illustrated.

Please refer to FIG. 1, FIG. 2A, FIG. 2B, and FIG. 3A. FIG. 1 illustrates a schematic perspective view of a display apparatus 2 and a display holding device 1 of the display apparatus 2 according to some embodiments; FIG. 2A illustrates an exploded view of the display apparatus 2 and the display holding device 1 of the display apparatus 2 shown in FIG. 1; FIG. 2B illustrates a partial exploded view of a front frame 10 of the display apparatus 2 and the display holding device 1 of the display apparatus 2 shown in FIG. 1; and FIG. 3A illustrates an enlarged partial perspective view of a display apparatus 2 and a display holding device 1 of the display apparatus 2 according to a first embodiment, where the section S along the line A-A shown in FIG. 1 is illustrated. In FIG. 1 and FIG. 2A, according to some embodiments, a display holding device 1 and a display apparatus 2 comprising the display holding device 1 are provided. The T side, the L side, the R side, and the B side are denoted as the top side, the left side, the right side, and the bottom side of the display apparatus 2, respectively. The display holding device 1 comprises a front frame 10 (which will be described later) and a rear plate 12 (which will be described later). The front frame 10 is adapted to contain an optical transceiver module 23, a liquid crystal module 21, and a light-transmissive module 20 (shown in FIG. 2B and FIG. 3A, which will be described later). The rear plate 12 is connected to the front frame 10 and adapted to contain an optical film module 22 (which will be described later). The front frame 10, the light-transmissive module 20, the optical film module 22, and the rear plate 12 are sequentially arranged along the same direction (e.g., along the X direction shown in FIG. 2A), and the optical transceiver module 23 is inside the front frame 10 (shown in FIG. 2B, which will be described later).

The light-transmissive module 20 may be a light-transmissive glass. The liquid crystal module 21 may be a liquid crystal (LCD) panel or a component comprising the LCD panel. After the liquid crystal module 21 is combined with a backlight assembly (e.g., the optical film module 22) acting as a backlight source, the combined assembly is thus capable of generating images on the LCD panel, or the light can even be transmitted through the light-transmissive module 20 and emitted to generate images on the light-transmissive module 20.

The optical transceiver module 23 (shown in FIG. 2B and FIG. 3A) may usually be an IR touch module which is capable of emitting an IR light detection signal and also capable of receiving an IR light detection signal. Therefore, in some embodiments, according to the receiving result of the IR light detection signal, the touch position and the motion track of a touch on the liquid crystal module 21 and/or the light-transmissive module 20 can be detected and determined. For example, the IR light detection signal would be interrupted before being received by the optical transceiver module 23, and thus the IR light detection signal cannot further be transmitted to the optical transceiver module 23.

More specifically, in FIG. 2B, according to some embodiments, at least two opposite sides among the T side, the L side, the R side, and the B side of the front frame 10 contain the optical transceiver module 23. For example, each of the T side and the opposite side of the T side (i.e., the B side) of the front frame 10 has the optical transceiver module 23, and these optical transceiver modules 23 are arranged in pairs along the same direction on the T side and the B side, respectively. Hence, the optical transceiver module 23 at the T side (or the B side) can correspondingly receive the light emitted from the optical transceiver module 23 at the opposite B side (or the T side). Meanwhile, the optical transceiver module 23 at the T side (or the B side) can correspondingly emit the light that can be received by the optical transceiver module 23 at the opposite B side (or the T side). For another example, similarly, each of the L side and the opposite side of the L side (i.e., the R side) of the front frame 10 has the optical transceiver module 23, and these optical transceiver modules 23 are arranged in pairs along the same direction on the L side and the R side, respectively. Hence, the optical transceiver module 23 at the L side (or the R side) can correspondingly receive the light emitted from the optical transceiver module 23 at the opposite R side (or the L side). Meanwhile, the optical transceiver module 23 at the L side (or the R side) can correspondingly emit the light that can be received by the optical transceiver module 23 at the opposite R side (or the L side). Therefore, in some embodiments, through the IR light detection signal emitted from the optical transceiver module 23 at the L side and the T side (shown in FIG. 1, for example) and once the IR light detection signal is interrupted at a certain position (e.g., a coordinate position denoted as (y1, z1), which is not shown in the figure), the IR light detection signal emitted from the L side cannot be thus received by the optical transceiver module 23 at the R side (which is correspondingly arranged along a direction from the L side to the R side (e.g., arranged along a straight line of $z=z1$)); in a meanwhile, the IR light detection signal emitted from the T side cannot be received by the optical transceiver module 23 at the B side (which is correspondingly arranged along a direction from the T side to the B side (e.g., arranged along a straight line of $y=y1$)). Therefore, the specific coordinate position (i.e., (y1, z1)) that is interrupted can be detected and determined.

The optical film module 22 may be a backlight module of the liquid crystal module 21, and the optical film module 22 may have a thin film portion 220 (shown in FIG. 3A, which may be a film, such as a polarizer, a filter, or a liquid crystal laminate) and a reflection portion 221 (shown in FIG. 3A, which may be a light-guiding plate or a light-reflecting plate). In some embodiments, the thin film portion 220 is on a side of the reflection portion 221 adjacent to the liquid crystal module 21. Accordingly, in this embodiment, a display apparatus 2 having the functions of IR touch can be provided by the display holding device 1 in combination with the corresponding modules or components (e.g., the light-transmissive module 20, the liquid crystal module 21, and the optical transceiver module 23).

Please still refer to FIG. 3A. The front frame 10 comprises an edge portion 100, a top portion 101, a containing portion 106, an extending portion 108, and a holding portion 104. The top portion 101 is connected to the edge portion 100. The containing portion 106 has a receiving space. An end of the containing portion 106 is connected to the edge portion 100, and the containing portion 106 is adapted to contain the optical transceiver module 23. The extending portion 108 is connected to an another end of the containing portion 106. The extending portion 108 extends toward a direction away from the edge portion 100 (e.g., the −Y direction shown in FIG. 3A), and the extending portion 108 is adapted to contain the liquid crystal module 21. The holding portion 104 is between the containing portion 106 and the extending portion 108, and the holding portion 104 is adapted to contain the light-transmissive module 20. The rear plate 12 is connected to the front frame 10, and the rear plate 12 is adapted to contain the optical film module 22. For example, the holding portion 104 and the top portion 101 together may fix the light-transmissive module 20, and the light-transmissive module 20 and the extending portion 108 together may fix the liquid crystal module 21, so that a relative displacement between the light-transmissive module 20 and the extending portion 108 can be avoided. Furthermore, the rear plate 12 and the extending portion 108 together may fix the optical film module 22, so that a relative displacement between the optical film module 22 and the extending portion 108 can be avoided. Hence, in some embodiments, through the compact arrangement of the above modules and components, the display holding device 1 can provide not only functions of IR touch but also an appearance that is more likely to be favored by consumers due to a narrower width of the outer frame (e.g., the width L1 of the top portion 101 shown in FIG. 1 and FIG. 3B, which will be described later).

In FIG. 3A, the materials of the edge portion 100, the top portion 101, the extending portion 108, the holding portion 104, and the rear plate 12 may independently be metal or alloy. That is, in some embodiments, the materials of the edge portion 100, the top portion 101, the extending portion 108, the holding portion 104, and the rear plate 12 may be identical to or different from each other, which is not limited herein. For example, the materials of the edge portion 100, the top portion 101, the extending portion 108, and the holding portion 104 are all aluminum or aluminum alloy, while the material of the rear plate 12 is iron or iron alloy.

In some embodiments, the edge portion 100, the top portion 101, the extending portion 108, and the holding portion 104 are integrally formed as a one-piece member and thus a further assembling of the edge portion 100, the top portion 101, the extending portion 108, and the holding portion 104 is not necessarily needed. Hence, time and costs needed for the existing device known to the inventor to further assemble the edge portion 100, the top portion 101, the extending portion 108, and the holding portion 104 can be avoided. In addition, according to some embodiments, since the components (e.g., screws and washers) of the existing device known to the inventor that are used for assembling are omitted, the overall weight of the display holding device 1 can be lighter than the overall weight of the existing device known to the inventor.

In FIG. 3A, according to some embodiments, the display holding device 1 further comprises a fixing element 13. The fixing element 13 may comprise a first fixing portion 130 between the light-transmissive module 20 and the holding portion 104, so that the light-transmissive module 20 can be fixed to the holding portion 104 through the first fixing portion 130. The fixing element 13 may comprise a second fixing portion 131 between the light-transmissive module 20 and the liquid crystal module 21, so that the liquid crystal module 21 can be fixed to the light-transmissive module 20 through the second fixing portion 131. The fixing element 13 may comprise a third fixing portion 132 between the liquid crystal module 21 and the extending portion 108, so that the liquid crystal module 21 can be fixed to the extending portion 108 through the third fixing portion 132. The fixing element 13 may comprise a fourth fixing portion 133 between the extending portion 108 and the optical film module 22, so that the optical film module 22 can be fixed to the extending portion 108 through the fourth fixing portion 133. The first fixing portion 130, the second fixing portion 131, the third fixing portion 132, and the fourth fixing portion 133 may independently be any component having a function of attaching, such as a double-sided tape or a foam tape, which is not limited herein. Therefore, in some embodiments, through the arrangement of the fixing element 13, the light-transmissive module 20, the liquid crystal module 21, and/or the optical film module 22 can be fixed to the front frame 10 more stably, so that a relative displacement between the modules and the components can be avoided.

In FIG. 3A, according to some embodiments, the rear plate 12 further comprises a rear-plate body 120 and a rear-plate fixing portion 121. The rear-plate body 120 extends along a direction away from the edge portion 100 and the rear-plate body 120 is substantially parallel to the liquid crystal module 21. The rear-plate fixing portion 121 is on a side of the rear-plate body 120 adjacent to the edge portion 100, so that the rear-plate body 120 can be fixed to the front frame 10 through the rear-plate fixing portion 121. The material of the rear-plate body 120 may be metal or alloy, such as iron or iron alloy. The rear-plate fixing portion 121 may be any component having a function of fixing, such as a screw, a bolt, or a pin, which is not limited herein.

In FIG. 3A, according to some embodiments, the front frame 10 further comprises a first protrusion 102. An end of the first protrusion 102 is connected to the edge portion 100, and an another end of the first protrusion 102 is connected to the extending portion 108, so that the containing portion 106 is formed by the first protrusion portion 102, the edge portion 100, the extending portion 108, and the holding portion 104 together. The material of the first protrusion 102 may be metal or alloy, such as aluminum or aluminum alloy. In some embodiments, the first protrusion 102 and the other components of the front frame 10 are integrally formed as a one-piece member. In some embodiments, the first protrusion 102 extends along a direction away from the edge portion 100 (e.g., the −Y direction shown in FIG. 3A); therefore, in some embodiments, through adjusting the extending length of the first protrusion 102 (e.g., the length along the −Y direction shown in FIG. 3A), the size of the containing portion 106 can be correspondingly adjusted. Hence, in some embodiments, through the arrangement of the first protrusion 102, the optical transceiver module 23 can be fixed to the containing portion 106 more stably. Moreover, in some embodiments, the first protrusion 102 may have a counterpart corresponding to the rear-plate fixing portion 121, and the counterpart may be a screw hole or a cavity. Hence, in some embodiments, through the arrangements of the first protrusion 102 and the rear-plate fixing portion 121, the rear-plate body 120 can be fixed to the front frame 10 more stably. Meanwhile, in some embodiments, through the arrangements of the first protrusion 102 and the rear-plate fixing portion 121, the optical film module 22 can also be fixed between the rear-plate body 120 and the extending portion 108 more stably.

In FIG. 3A, according to some embodiments, the display holding device 1 further comprises a rear frame 14. The rear frame 14 is connected to the front frame 10, so that the rear plate 12 can be fixed to the front frame 10 through the rear frame 14. According to some embodiments, the rear frame 14 comprises a rear-frame body 140 and a rear-frame fixing portion 141 (shown in FIG. 5A, which will be described later and thus is not shown in FIG. 3A). The rear-frame body 140 extends along a direction away from the edge portion 100 (e.g., along the −Y direction shown in FIG. 3A) and the rear-frame body 140 is substantially parallel to the liquid crystal module 21. The rear-frame fixing portion 141 (shown in FIG. 5A) is on a side of the rear-frame body 140 adjacent to the edge portion 100, so that the rear-frame body 140 can be fixed to the front frame 10 through the rear-frame fixing portion 141. The material of the rear-frame body 140 may be any component having a function of fixing, such as a screw, a bolt, or a pin, which is not limited herein. In some embodiments, the rear-frame body 140 may have a counterpart corresponding to the rear-frame fixing portion 141, and the counterpart may be a screw hole or a cavity. Hence, in some embodiments, through the arrangement of the rear-frame fixing portion 141, the rear-frame body 140 can be fixed to the front frame 10 more stably. Moreover, in some embodiments, through the arrangement of the rear frame 14, a side of the rear plate 12 of the display holding device 1 (and even the overall display holding device 1 as well as the interior modules and components of the display holding device 1) can be prevented from being collided with other modules or components and damaged.

Some embodiments of the optical transceiver module 23 are further described as below.

Please still refer to FIG. 2B and FIG. 3A. The optical transceiver module 23 comprises a module body 230 and one or more optical transceiver portions 231. Each of the optical transceiver portions 231 is on the module body 230 and adapted to emit or receive a light. For example, each side of the front frame 10 (e.g., the L side of the front frame 10 shown in FIG. 1B) has a module body 230 and one or more optical transceiver portions 231 on the module body 230. Moreover, the opposite side (e.g., the R side shown in FIG. 1) of each side of the front frame 10 (e.g., the L side shown in FIG. 1) also has the optical transceiver portion(s) 231, in which the number of the optical transceiver portion(s) 231 at the side (e.g., the L side) of the front frame 10 is identical with the number of the optical transceiver portion(s) 231 at the opposite side (e.g., the R side) of the front frame 10. In some embodiments, the optical transceiver portion(s) 231 is adapted to allow the light emitted or received by the optical transceiver portion(s) 231 to be substantially perpendicular to the light-transmissive module 20 (shown in FIG. 3A). Alternatively, in some other embodiments, the optical transceiver portion(s) 231 is adapted to allow the light emitted or received by the optical transceiver portion(s) 231 to be substantially parallel to the light-transmissive module 20 (shown in FIG. 5A, which will be described later).

For example, in FIG. 3A, the containing portion 106 is between the first protrusion 102 and the second protrusion 103, and the containing portion 106 is also between the edge portion 100 and the holding portion 104. The module body 230 is an elongated board (shown in FIG. 2B) extending inside the containing portion 106 and along the Z direction shown in FIG. 3A. The module body 230 of the optical transceiver module 23 has a main surface (e.g., the surface parallel to the XZ plane shown in FIG. 3A), and the main surface of the module body 230 is substantially parallel to a main surface of the edge portion 100 (e.g., the XZ plane shown in FIG. 3A). The optical transceiver portion(s) 231 is on the module body 230, and the direction of the light emitted by the optical transceiver portion(s) 231 (e.g., the −X direction shown in FIG. 3A) or the direction of the light received by the optical transceiver portion(s) 231 (e.g., the +X direction shown in FIG. 3A) is substantially perpendicular to the light-transmissive module 20 (e.g., the YZ plane shown in FIG. 3A). In other words, according to some embodiments, the direction of the light emitted or received by the optical transceiver portion(s) 231 (e.g., the X direction shown in FIG. 3A) is substantially parallel to the main surface of the module body 230 (e.g., the XZ plane shown in FIG. 3A). Furthermore, after the light is emitted by the optical transceiver portion(s) 231, the light can be reflected (e.g., by the reflection portion 110, which will be described later), so that the direction of the light can be adjusted from the direction substantially perpendicular to the light-transmissive module 20 (e.g., the −X direction shown in FIG. 3A) to the direction substantially parallel to the light-transmissive module 20 (e.g., the −Y direction shown in FIG. 3A). Likewise, before the light is received by the optical transceiver portion(s) 231, the light can be reflected (e.g., by the reflection portion 110, which will be described later), so that the direction of the light can be adjusted from the direction substantially parallel to the light-transmissive module 20 (e.g., the +Y direction shown in FIG. 3A) to the direction substantially perpendicular to the light-transmissive module 20 (e.g., the +X direction shown in FIG. 3A), and thus the light can be further received by the optical transceiver portion(s) 231.

In FIG. 3A, according to some embodiments, the containing portion 106 has an opening 105 toward the top portion 101, and the opening 105 is between the edge portion 100 and the holding portion 104. The opening 105 may correspond to the optical transceiver portion(s) 231 (shown in FIG. 3A), or may not necessarily correspond to the optical transceiver portion(s) 231 (shown in FIG. 5A, which will be described later). Hence, in some embodiments, as shown in FIG. 3A, the opening 105 may correspond to the optical transceiver portion(s) 231, and the light emitted by the optical transceiver portion(s) 231 may be transmitted through the opening 105 and toward a direction away from the optical transceiver portion(s) 231 (e.g., the −X direction shown in FIG. 3A). Meanwhile, through the opening 105, the optical transceiver portion(s) 231 may also receive the light transmitted toward a direction adjacent to the optical transceiver portion(s) 231 (e.g., the +X direction shown in FIG. 3A). Therefore, in some embodiments, through the arrangement of the opening 105, the transmitting direction of the light emitted or received by the optical transceiver portion(s) 231 can be restricted to a particular transmitting direction.

In FIG. 3A, according to some embodiments, the front frame 10 further comprises a second protrusion 103. An end of the second protrusion 103 is connected to the edge portion 100, so that the opening 105 is formed by an another end of the second protrusion 103 and the holding portion 104 together. In some embodiments, the light-transmissive module 20 is on the holding portion 104 and extends along a direction adjacent to the edge portion 100 (e.g., the +Y direction shown in FIG. 3A), so that a portion of the light-transmissive module 20 is on (right on or above) the second protrusion 103. Hence, the light-transmissive module 20 may be on (right on or above) the opening 105 and the light-transmissive module 20 may be a light-transmissive element, the light emitted and/or received by the optical transceiver portion(s) 231 can thus be transmitted through the opening 105 and the light-transmissive module 20.

In FIG. 3A, according to some embodiments, the display holding device 1 further comprises an optical auxiliary element 11. The optical auxiliary element 11 comprises a light-transmissive portion 111, and the light-transmissive portion 111 is between the top portion 101 and the holding portion 104 to allow the light emitted or received by the optical transceiver module 23 to be transmitted through the light-transmissive portion 111. The light-transmissive portion 111 may be a translucent glass or other light-transmissive materials. Therefore, in some embodiments, through the arrangement of the light-transmissive portion 111, the light can be distributed more uniformly over the portion between the top portion 101 and the light-transmissive module 20. In addition, in some embodiments, through the arrangements of the top portion 101, the light-transmissive portion 111, and the holding portion 104, the light-transmissive module 20 can be fixed to the front frame 10 more stably, so that a relative displacement between the light-transmissive module 20 and the top portion 101 and/or a relative displacement between the light-transmissive module 20 and the holding portion 104 can be avoided.

In FIG. 3A, according to some embodiments, the optical auxiliary element 11 further comprises a reflection portion 110. The reflection portion 110 corresponds to the optical transceiver module 23 and the optical auxiliary element 11 to reflect the light emitted or received by the optical transceiver module 23. In other words, according to some embodiments, the reflection portion 110 corresponds to the transmitting path of the light emitted or received by the optical transceiver module 23 and the reflection portion 110 is between the optical transceiver module 23 and the light-transmissive portion 111, so that the transmitting path of the light emitted or received by the optical transceiver module 23 can be adjusted. In some embodiments, the reflection portion 110 has an inclined surface. An inclined angle is between the inclined surface and a main surface of the reflection portion 110 (e.g., the YZ plane shown in FIG. 3A), and the position of the inclined angle and the inclined surface can be arranged and adjusted corresponding to the transmitting path and the transmitting direction of the light.

For example, in FIG. 3A, the transmitting direction of the light emitted by the optical transceiver module 23 is substantially parallel to the –X direction shown in FIG. 3A, and the transmitting direction is also substantially perpendicular to the extending direction of the top portion 101 (e.g., the –Y direction shown in FIG. 3A). Hence, the light will be interrupted by the top portion 101 and thus cannot be further transmitted along the –X direction. Through the reflection portion 110 having the inclined angle (e.g., 45 degrees), the transmitting direction of the light can be properly adjusted (e.g., by 90 degrees) on the inclined surface, so that the transmitting direction of the light can be further adjusted to be substantially parallel to the light-transmissive module 20 (e.g., the –Y direction shown in FIG. 3A).

In FIG. 3A, according to some embodiments, the height of the light-transmissive portion 111 (e.g., the size of the light-transmissive portion 111 along the X direction shown in FIG. 3A) may be greater than or equal to the height of the reflection portion 110 (e.g., the size of the reflection portion 110 along the X direction). Therefore, as compared with the reflection portion 110, the light-transmissive portion 111 may be on the top portion 101 and protrude further toward the +X direction, for example, so that the light-transmissive portion 111 can be attached to the light-transmissive module 20 more tightly. Accordingly, in some embodiments, the light-transmissive portion 111 and a side of the light-transmissive module 20 adjacent to the edge portion 100 can be prevented from being collided with each other and damaged.

In FIG. 3A, according to some embodiments, the optical auxiliary element 11 further comprises a cushioning portion 109. The cushioning portion 109 is connected to the edge portion 100 and corresponds to the light-transmissive module 20. That is, an end of the cushioning portion 109 is connected to the edge portion 100, and an another end of the cushioning portion 109 is adjacent to the light-transmissive module 20, so that the cushioning portion 109 is between the edge portion 100 and the light-transmissive module 20. The cushioning portion 109 may be any component having a function of stress buffering; for example, the material of the cushioning portion 109 may be rubber, plastic, or a combination thereof; for another example, the material of the cushioning portion 109 is rubber. Therefore, through the arrangement of the cushioning portion 109, a relative displacement between the light-transmissive module 20 and the top portion 101 and/or a relative displacement between the light-transmissive module 20 and the holding portion 104 can be avoided, and thus the light-transmissive portion 111 (or even the top portion 101) and a side of the light-transmissive module 20 adjacent to the edge portion 100 can be prevented from being collided with each other and damaged.

In FIG. 3A, according to some embodiments, the front frame 10 further has a hollow portion 107. The hollow portion 107 is a space between the edge portion 100 and the extending portion 108. For example, the hollow portion 107 is between the edge portion 100 and the extending portion 108, the hollow portion 107 is also between the first protrusion 102 and the second protrusion 103, and the hollow portion 107 is in communication with the opening 105. Hence, through the arrangement of the hollow portion 107, the front frame 10 can be made of material(s) with relatively less amounts but still have the mechanical strength to protect the liquid crystal module 21 from being collided with other modules or components or damaged. In other words, according to some embodiments, through the arrangement of the hollow portion 107, the weight of the front frame 10 can be reduced, so that the overall weight of the display holding device 1 (and even the display apparatus 2 comprising the display holding device 1) can be further reduced.

According to the above description, in the first embodiment shown in FIG. 3A, the display holding device 1 (and even the display apparatus 2 comprising the display holding device 1) with a narrower width of the outer frame (i.e., the front-frame width; for example, the width L1 of the top portion 101 shown in FIG. 1 and FIG. 3B, which will be described later) and a relatively larger image-display area can be provided, and thus the display holding device 1 (and even the display apparatus 2 comprising the display holding device 1) can be more likely to be favored by customers.

Figure 3B:
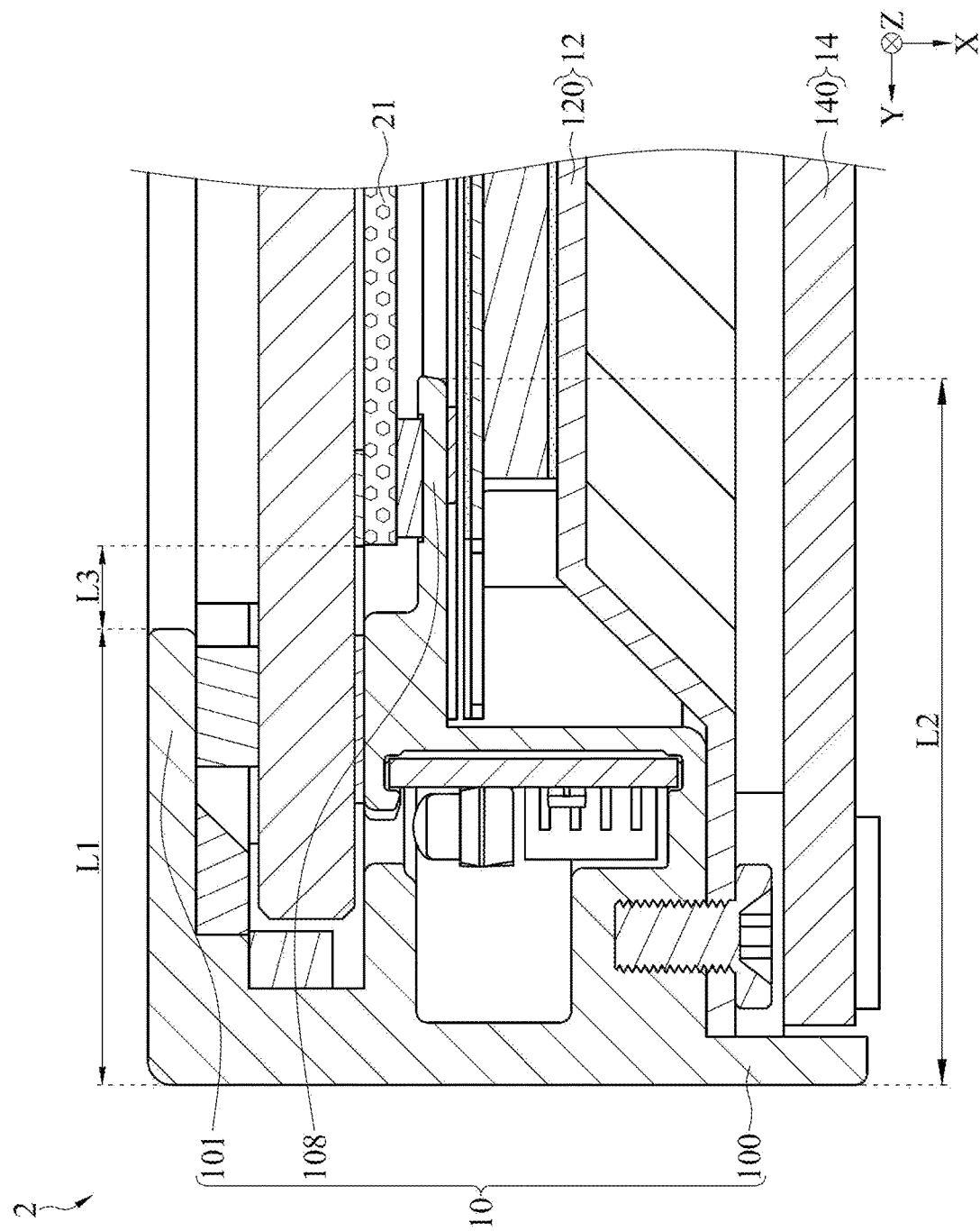
FIG. 3B illustrates an enlarged partial perspective view of the display apparatus and the display holding device of the display apparatus shown in FIG. 3A.

Specifically, please refer to FIG. 3B. FIG. 3B illustrates an enlarged partial perspective view of the display apparatus 2 and the display holding device 1 of the display apparatus 2 shown in FIG. 3A. In FIG. 3B, a first end of the top portion 101 is an end of the top portion 101 adjacent to the edge portion 100 and connected to the edge portion 100, and a second end of the top portion 101 is an end of the top portion 101 away from the edge portion 100. For example, along the Y direction shown in FIG. 3B, the top portion 101 has a width L1 (i.e., the front-frame width), and the width L1 is a distance between the first end of the top portion 101 and the second end of the top portion 101. In some implementations of the first embodiment shown in FIG. 3B, the width L1 is less than or substantially equal to 19 mm. In FIG. 3B, an end of the extending portion 108 is away from the edge portion 100. A shortest distance between the edge portion 100 and the end of the extending portion 108 is defined as a first distance L2, while a shortest distance between the second end of the top portion 101 (i.e., the end of the top portion 101 away from the edge portion 100) and an end of the liquid crystal module 21 adjacent to the edge portion 100 is defined as a second distance L3. In some embodiments, the width L1 of the top portion 101 is less than the first distance L2. In some embodiments, the distance between the liquid crystal module 21 and the edge portion 100 (e.g., the sum of the width L1 of the top portion 101 and the second distance L3) is less than or substantially equal to the first distance L2. Therefore, in some embodiments, through reducing the first distance L2, the liquid crystal module 21 on the extending portion 108 may further extend toward the +Y direction shown in FIG. 3B, so that the liquid crystal module 21 can be fixed to the extending portion 108. Accordingly, the distance between the liquid crystal module 21 and the edge portion 100 can be much more reduced. Similarly, the liquid crystal module 21 on the extending portion 108 may further extend toward the −Y direction, the +Z direction, and the −Z direction shown in FIG. 1 at the same time; therefore, in some embodiments, the liquid crystal module 21 can provide a broader image-display area on the YZ plane shown in FIG. 1.

Figure 4A:
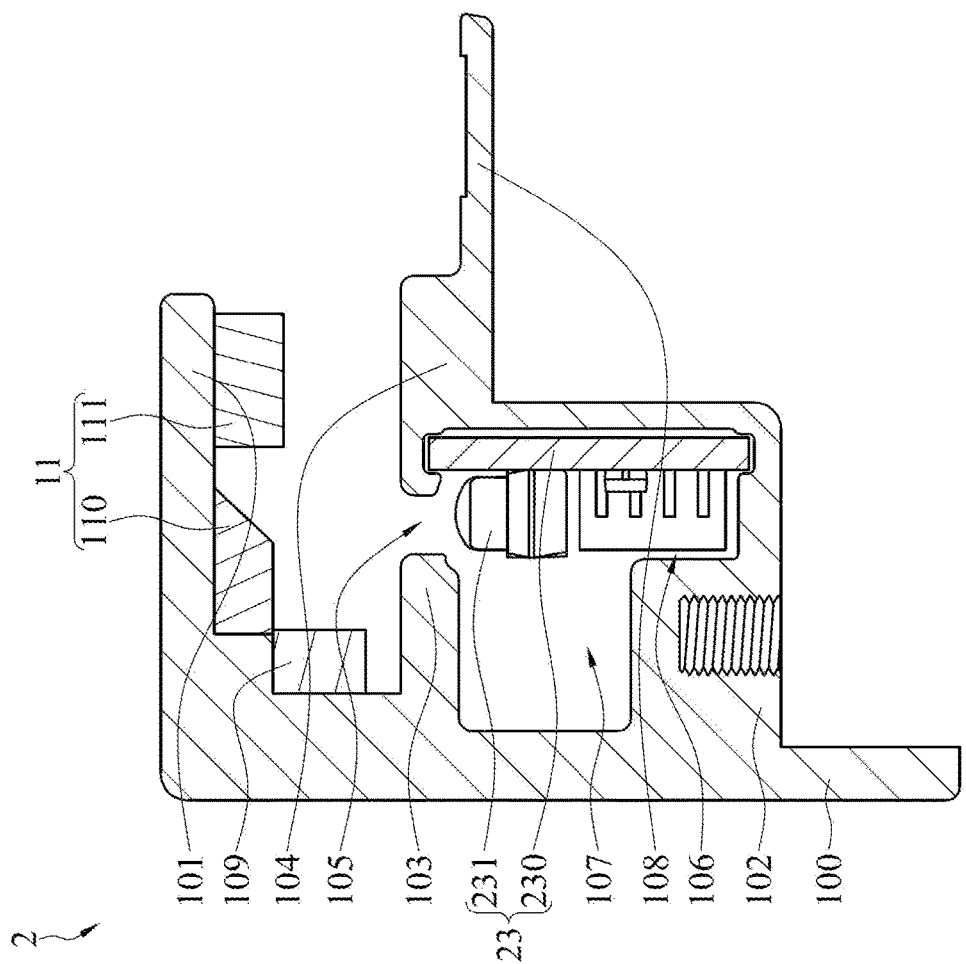
FIG. 4A illustrates an assembled perspective view of the display apparatus and the display holding device of the display apparatus shown in FIG. 3A.
Figure 4B:
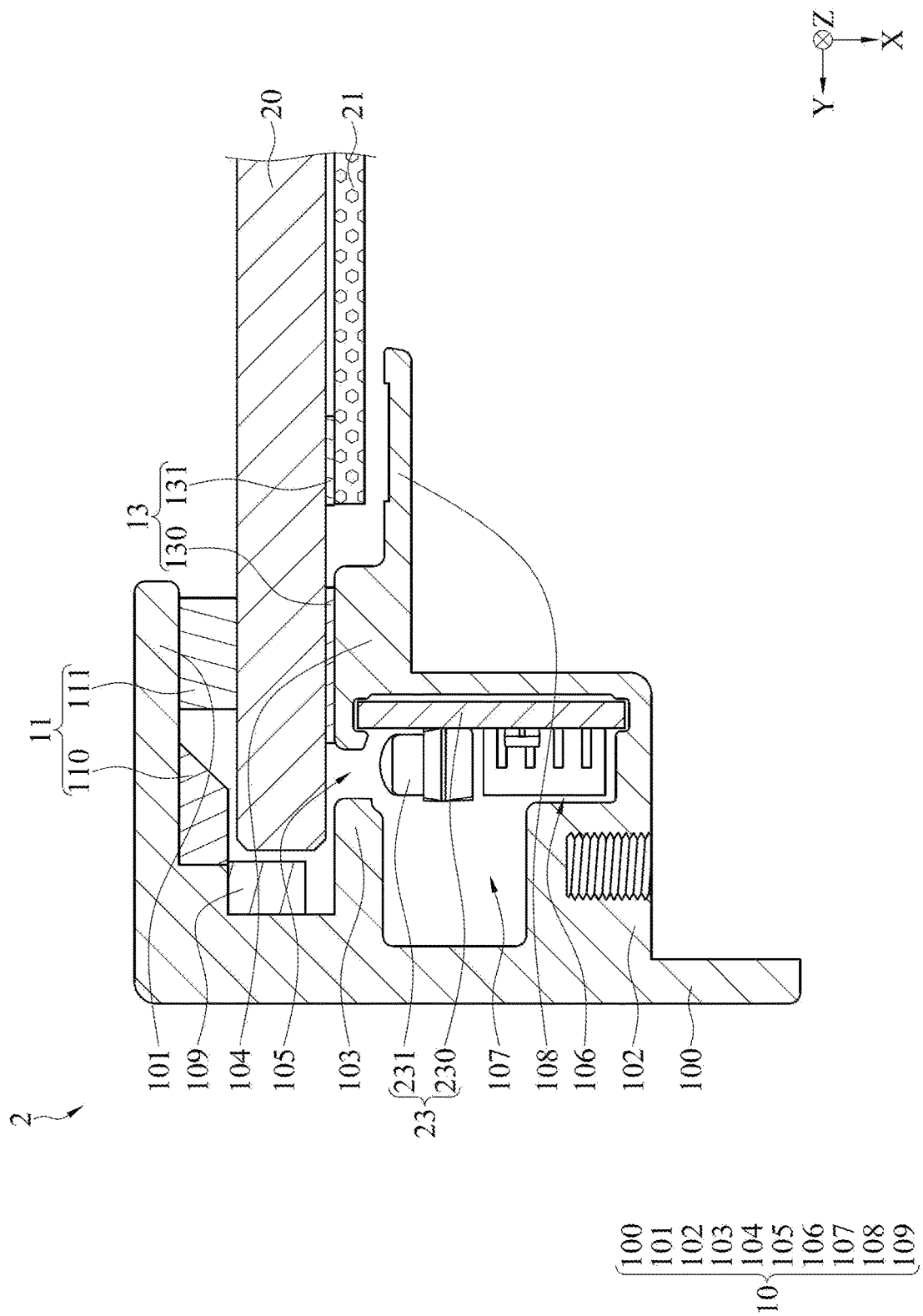
FIG. 4B illustrates an assembled perspective view of the display apparatus and the display holding device of the display apparatus shown in FIG. 3A.
Figure 4C:
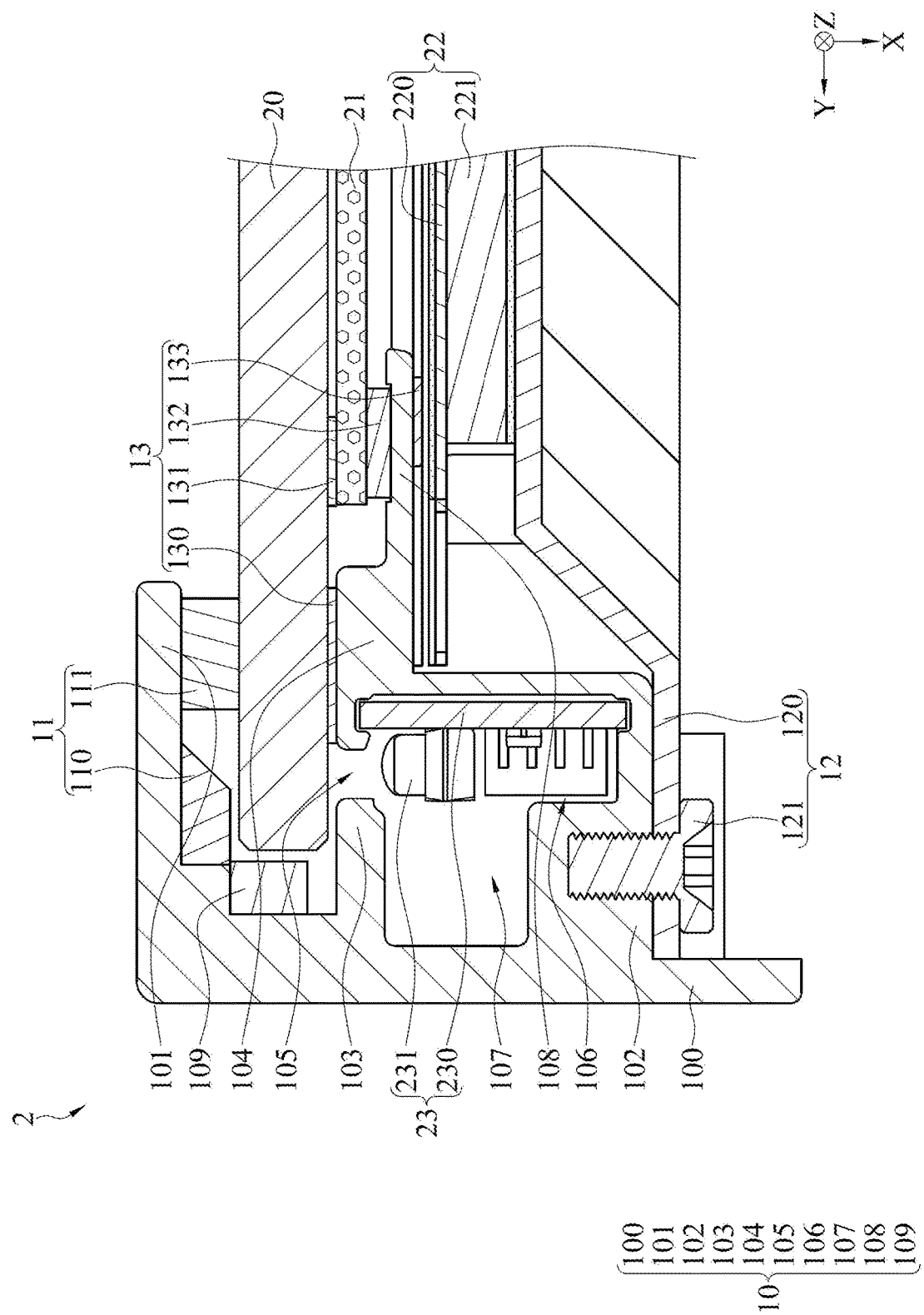
FIG. 4C illustrates an assembled perspective view of the display apparatus and the display holding device of the display apparatus shown in FIG. 3A.
Figure 4D:
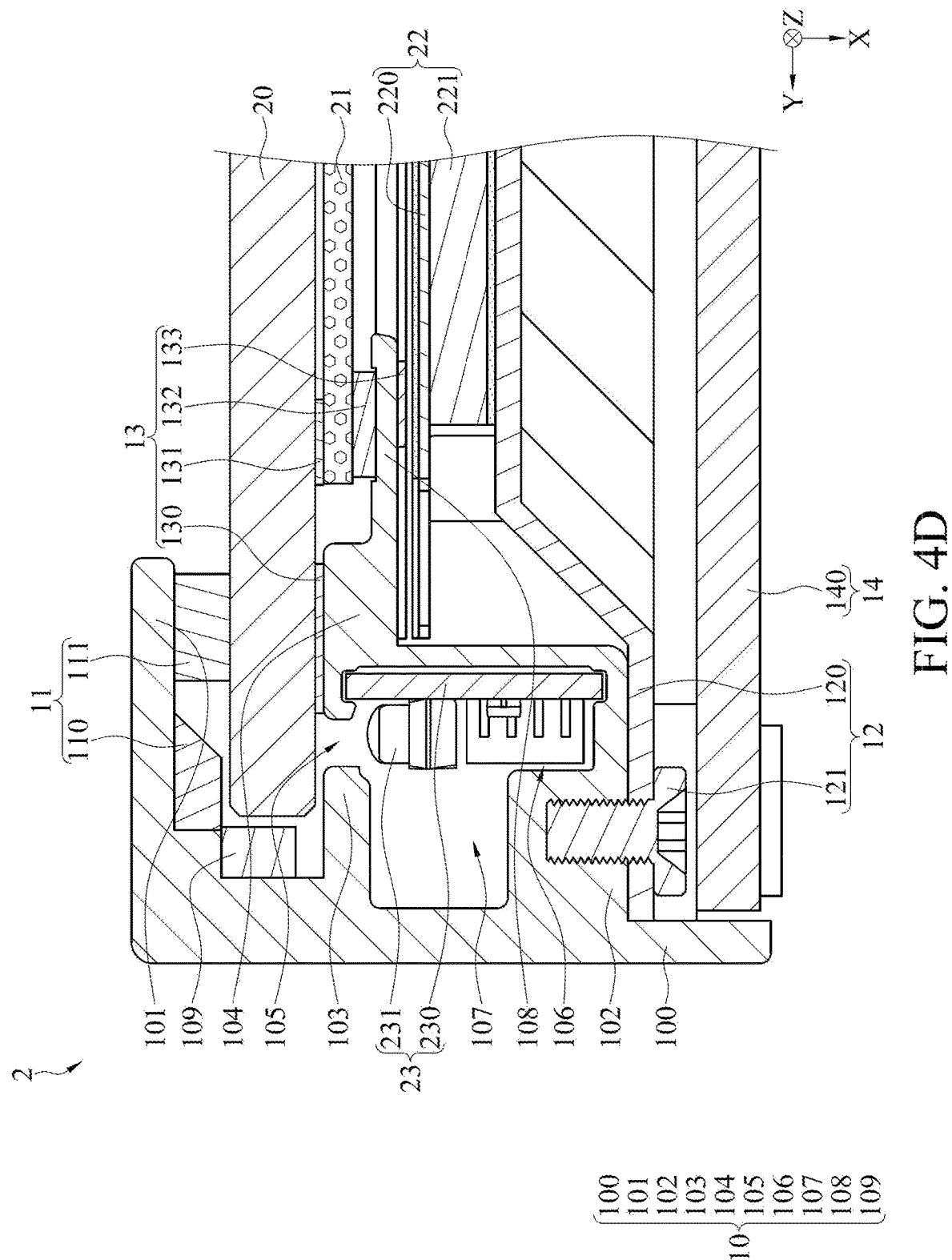
FIG. 4D illustrates an assembled perspective view of the display apparatus and the display holding device of the display apparatus shown in FIG. 3A.

The assembling processes of the display apparatus 2 (and the display holding device 1 of the display apparatus 2) shown in FIG. 3A according to some embodiments are further described as below. Please refer to FIG. 4A to FIG. 4D. FIG. 4A to FIG. 4D respectively illustrate assembled perspective views of the display apparatus 2 and the display holding device 1 of the display apparatus 2 shown in FIG. 3A. In some embodiments, as shown in FIG. 4A, the optical transceiver module 23 is first arranged in the containing portion 106 of the front frame 10, wherein the front frame 10 is integrally formed as a one-piece member. Meanwhile, the optical auxiliary element 11 (which may comprise the reflection portion 110 and the light-transmissive portion 111) is optionally arranged on the top portion 101; optionally, the cushioning portion 109 is further arranged on the edge portion 100. Next, as shown in FIG. 4B, through the second fixing portion 131, the liquid crystal module 21 is fixed to the light-transmissive module 20; and through the first fixing portion 130, the light-transmissive module 20 is fixed to the holding portion 104 of the front frame 10. Meanwhile, through the top portion 101 and the light-transmissive portion 111, the light-transmissive module 20 is attached to the holding portion 104 tightly, so that a relative displacement between the light-transmissive module 20 and the liquid crystal module 21 can be avoided. Next, as shown in FIG. 4C, through the third fixing portion 132, the liquid crystal module 21 is fixed to the extending portion 108; and through the fourth fixing portion 133, the assembled optical film module 22 (which may comprise the thin film portion 220 and the reflection portion 221) is fixed to the extending portion 108. Next, through the rear-plate fixing portion 121 of the rear plate 12, the rear-plate body 120 of the rear plate 12 is fixed to the front frame 10, and the optical film module 22 is fixed between the extending portion 108 and the rear-plate body 120 more stably. Next, as shown in FIG. 4D, through the rear-frame fixing portion 141 of the rear frame 14 (shown in FIG. 5A, which will be described later and thus is not further shown in FIG. 4D), the rear-frame body 140 of the rear frame 14 is fixed to the front frame 10. According to the above assembling process, in some embodiments, time and costs needed for the existing device known to the inventor to further assemble the components of the front frame 10 can be avoided. Moreover, in some embodiments, since the components (e.g., screws and washers) of the existing device known to the inventor that are used for assembling are omitted, the overall weight of the display apparatus 2 (and the display holding device 1 of the display apparatus 2) can be lighter than the overall weight of the existing device known to the inventor.

Figure 5A:
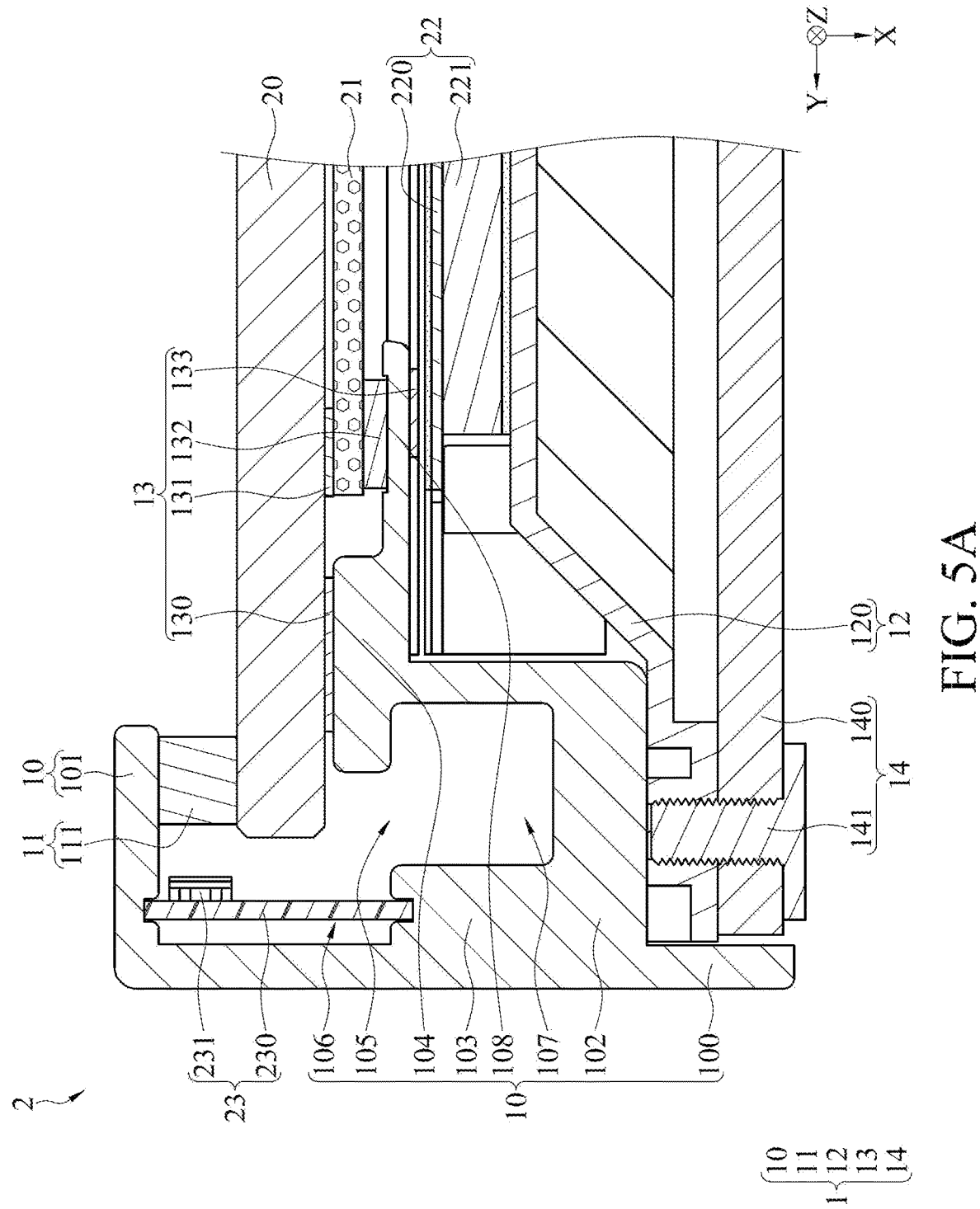
FIG. 5A illustrates an enlarged partial perspective view of a display apparatus and a display holding device of the display apparatus according to a second embodiment, where the section S along the line A-A shown in FIG. 1 is illustrated.

The display apparatus 2 (and the display holding device 1 of the display apparatus 2) according to a second embodiment are further described as below. Please refer to FIG. 5A. FIG. 5A illustrates an enlarged partial perspective view of a display apparatus 2 and a display holding device 1 of the display apparatus 2 according to a second embodiment, where the section S along the line A-A shown in FIG. 1 is illustrated. As compared to the first embodiment shown in FIG. 3A and FIG. 3B, the difference of the second embodiment shown in FIG. 5A is that, for example, the modules and components of the front frame 10 as well as the arrangements between the modules and components of the front frame 10 and the optical transceiver module 23. Hence, the components other than the front frame 10 and the optical transceiver module 23 as well as the corresponding embodiments of the arrangements thereof can be referred to the aforementioned embodiments, which will not be further described in detail herein.

In FIG. 5A, the edge portion 100, the top portion 101, the extending portion 108, and the holding portion 104 according to the second embodiment may also be integrally formed as a one-piece member and thus a further assembling of the edge portion 100, the top portion 101, the extending portion 108, and the holding portion 104 is not necessarily needed. The detailed embodiments can be referred to the aforementioned embodiments, which will not be further described in detail herein.

In FIG. 5A, the containing portion 106 according to the second embodiment is between the edge portion 100 and the extending portion 108. For example, the containing portion 106 is a receiving space formed by the edge portion 100, the top portion 101, and the holding portion 104, and the receiving space is also between the edge portion 100 and the extending portion 108. The detailed embodiments of the containing portion 106 can be referred to the aforementioned embodiments, which will not be further described in detail herein.

In FIG. 5A, the front frame 10 according to the second embodiment may further comprise a first protrusion 102. An end of the first protrusion 102 is connected to the edge portion 100, and an another end of the first protrusion 102 is connected to the extending portion 108, so that the containing portion 106 is formed by the first protrusion portion 102, the edge portion 100, the extending portion 108, and the holding portion 104 together. The detailed embodiments of the first protrusion 102 can be referred to the aforementioned embodiments, which will not be further described in detail herein.

In FIG. 5A, the front frame 10 according to the second embodiment may further comprise a second protrusion 103. An end of the second protrusion 103 is connected to the edge portion 100, so that the opening 105 is formed by an another end of the second protrusion 103 and the holding portion 104 together. Furthermore, in the second embodiment, the second protrusion 103 is further connected to the first protrusion 102, so that the second protrusion 103 and the first protrusion 102 are integrally formed as a one-piece member (e.g., protruding from the edge portion 100 toward the −Y direction shown in FIG. 5A and thus forming an L-shaped or a U-shaped protrusion). The detailed embodiments of the second protrusion 103 can be referred to the aforementioned embodiments, which will not be further described in detail herein.

In FIG. 5A, the optical transceiver module 23 according to the second embodiment comprises a module body 230 and one or more optical transceiver portions 231. Each of the optical transceiver portions 231 is on the module body 230 and adapted to emit or receive a light. In the second embodiment, the optical transceiver portion(s) 231 is adapted to allow the light emitted or received by the optical transceiver portion(s) 231 to be substantially parallel to the light-transmissive module 20. The detailed embodiments of the module body 230 and the optical transceiver portions 231 can be referred to the aforementioned embodiments, which will not be further described in detail herein.

For example, in FIG. 5A, the containing portion 106 is between the top portion 101 and the second protrusion 103, and the containing portion 106 is also between the edge portion 100 and the holding portion 104. The module body 230 is an elongated board (shown in FIG. 2B) extending in the containing portion 106 and along the Z direction shown in FIG. 5A, and the module body 230 corresponds to the light-transmissive module 20. The module body 230 of the optical transceiver module 23 has a main surface (e.g., the surface parallel to the XZ plane shown in FIG. 5A), and the main surface of the module body 230 is substantially parallel to a main surface of the edge portion 100 (e.g., the XZ plane shown in FIG. 5A). The optical transceiver portion(s) 231 is on the module body 230, and the direction of the light emitted by the optical transceiver portion(s) 231 (e.g., the −Y direction shown in FIG. 5A) or the direction of the light received by the optical transceiver portion(s) 231 (e.g., the +Y direction shown in FIG. 5A) is substantially parallel to the light-transmissive module 20 (e.g., the YZ plane shown in FIG. 5A). In other words, in some embodiments, the direction of the light emitted or received by the optical transceiver portion(s) 231 (e.g., the Y direction shown in FIG. 5A) is substantially perpendicular to the main surface of the module body 230 (e.g., the XZ plane shown in FIG. 5A). Furthermore, after the light is emitted by the optical transceiver portion(s) 231, the light can be transmitted directly through the light-transmissive portion 111 and continue to be transmitted along a direction substantially parallel to the light-transmissive module 20 (e.g., the −Y direction shown in FIG. 5A). Likewise, before the light is received by the optical transceiver portion(s) 231, the light can be transmitted directly through the light-transmissive portion 111 and continue to be transmitted along a direction substantially parallel to the light-transmissive module 20 (e.g., the +Y direction shown in FIG. 5A), so that the light can be further received by the optical transceiver portion(s) 231. Accordingly, the direction of the light emitted or received by the optical transceiver portion(s) 231 (e.g., the Y direction shown in FIG. 5A) may also be substantially parallel to the light-transmissive module 20 (e.g., the YZ plane shown in FIG. 5A). Therefore, in some implementations of the second embodiment shown in FIG. 5A, the transmitting direction of the light through the reflection portion 110 shown in FIG. 3A does not necessarily need to be adjusted. Hence, in some embodiments, the depletion of the light intensity caused by the reflection and/or refraction of the light through the reflection portion 110 during the transmission of the light can be prevented, so that the reading of the IR light detection signal can be prevented from being affected. In addition, according to some embodiments, since the arrangement of the reflection portion 110 is omitted, the weight of the front frame 10 can be reduced, so that the overall weight of the display holding device 1 (and even the display apparatus 2 comprising the display holding device 1) can be further reduced.

In FIG. 5A, the front frame 10 according to the second embodiment further has a hollow portion 107. The hollow portion 107 is a space between the edge portion 100 and the extending portion 108; for example, the hollow portion 107 is between the second protrusion 103 and the extending portion 108, and the space is in communication with the opening 105. The detailed embodiments of the hollow portion 107 can be referred to the aforementioned embodiments, which will not be further described in detail herein.

According to the above description, in the second embodiment shown in FIG. 5A, the display holding device 1 (and even the display apparatus 2 comprising the display holding device 1) with a narrower width of the outer frame (i.e., the front-frame width; for example, the width L1' of the top portion 101 shown in FIG. 5B, which will be described later) and a relatively larger image-display area can also be provided, and thus the display holding device 1 (and even the display apparatus 2 comprising the display holding device 1) can be more likely to be favored by customers.

Figure 5B:
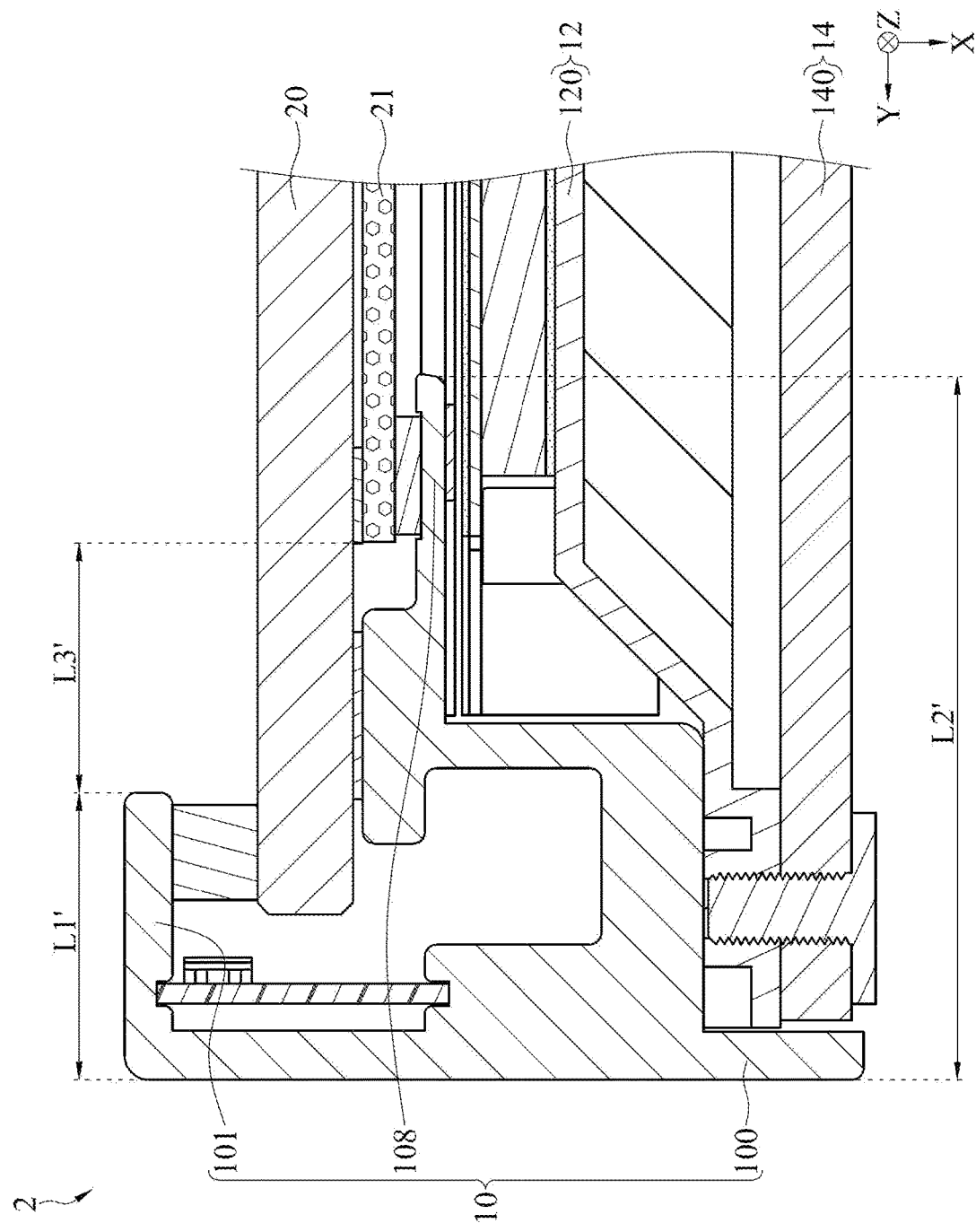
FIG. 5B illustrates an enlarged partial perspective view of the display apparatus and the display holding device of the display apparatus shown in FIG. 5A.

Specifically, please refer to FIG. 5B. FIG. 5B illustrates an enlarged partial perspective view of the display apparatus 2 and the display holding device 1 of the display apparatus 2 shown in FIG. 5A. In FIG. 5B, a first end of the top portion 101 is an end of the top portion 101 adjacent to the edge portion 100 and connected to the edge portion 100, and a second end of the top portion 101 is an end of the top portion 101 away from the edge portion 100. For example, along the Y direction shown in FIG. 5B, the top portion 101 has a width L1' (i.e., the front-frame width), and the width L1' is a distance between the first end of the top portion 101 and the second end of the top portion 101. In some implementations of the second embodiments shown in FIG. 5B, the width L1' is less than or substantially equal to 12 mm. That is, as compared with the width L1 of the first embodiment shown in FIG. 3B, the width L1' of the second embodiment may be arranged much narrower. In FIG. 5B, an end of the extending portion 108 is away from the edge portion 100. A shortest distance between the edge portion 100 and the end of the extending portion 108 is defined as a first distance L2', while a shortest distance between the second end of the top portion 101 (i.e., the end of the top portion 101 away from the edge portion 100) and an end of the liquid crystal module 21 adjacent to the edge portion 100 is defined as a second distance L3'. In some embodiments, the width L1' of the top portion 101 is less than the first distance L2'. In some embodiments, the distance between the liquid crystal module 21 and the edge portion 100 (e.g., the sum of the width L1' of the top portion 101 and the second distance L3') is less than or substantially equal to the first distance L2'. Therefore, in some embodiments, through reducing the first distance L2', the liquid crystal module 21 on the extending portion 108 may further extend toward the +Y direction shown in FIG. 5B, so that the liquid crystal module 21 can be fixed to the extending portion 108. Accordingly, the distance between the liquid crystal module 21 and the edge portion 100 can be much more reduced. Similarly, the liquid crystal module 21 on the extending portion 108 may further extend toward the −Y direction, the +Z direction, and the −Z direction shown in FIG. 1 at the same time; therefore, in some embodiments, the liquid crystal module 21 can provide a broader image-display area on the YZ plane shown in FIG. 1.

The assembling processes of the display apparatus 2 and the display holding device 1 of the display apparatus 2 according to the second embodiment shown in FIG. 5A to FIG. 5B can be referred to the aforementioned assembly process (shown in FIG. 4A to FIG. 4D) of the display apparatus 2 and the display holding device 1 of the display apparatus 2 according to the first embodiment, which will not be further described in detail herein.

Furthermore, please refer again to FIG. 3A and FIG. 5A. In some embodiments, a display apparatus 2 is also provided. The display apparatus 2 comprises a light-transmissive module 20, an optical transceiver module 23, a liquid crystal module 21, an optical film module 22, a front frame 10, and a rear plate 12. The optical transceiver module 23 comprises a module body 230 and one or more optical transceiver portions 231. Each of the optical transceiver portions 231 is on the module body 230 and adapted to emit or receive a light. The front frame 10 comprises an edge portion 100, a top portion 101, an extending portion 108, a containing portion 106, and a holding portion 104. The top portion 101 is connected to the edge portion 100. The extending portion 108 is connected to the edge portion 100 and extends along a direction away from the edge portion 100 (e.g., the −Y direction shown in FIG. 3A and FIG. 5A), and the extending portion 108 contains the liquid crystal module 21. The containing portion 106 is between the edge portion 100 and the extending portion 108, and the containing portion 106 contains the optical transceiver module 23. The module body 230 of the optical transceiver module 23 has a main surface (e.g., the XZ plane shown in FIG. 3A and FIG. 5A), and the main surface of the module body 230 is substantially parallel to the edge portion 100 (e.g., the XZ plane shown in FIG. 3A and FIG. 5A). The holding portion 104 is between the containing portion 106 and the extending portion 108, and the holding portion 104 contains the light-transmissive module 20. The rear plate 12 is connected to the front frame 10, and the rear plate 12 contains the optical film module 22. The embodiments of the above modules and components can be referred to the aforementioned embodiments, which will not be further described in detail herein. Accordingly, in some embodiments, through the display holding device 1 having the outer frame with a narrower width (i.e., the front-frame width), in combination with the light-transmissive module 20, the optical transceiver module 23, the liquid crystal module 21, and the optical film module 22, the display apparatus 2 having a function of the IR touch detection and an appearance that is more likely to be favored by consumers can be provided.

To sum up, in some embodiments, through modules and components of the front frame that are arranged more tightly to each other, the front-frame width can be further reduced to a front-frame width that is narrower than the existing front-frame width known to the inventor. Hence, in some embodiments, a display apparatus (and a display holding device of the display apparatus) not only having the original functions (e.g., a function of IR touch detection) but also having a designed appearance can be provided. Moreover, in some embodiments, through the arrangements that the components of the front frame are integrally formed as a one-piece member, time and costs needed for the assembly of the existing device known to the inventor can be further reduced, and the overall weight of the display apparatus (and the display holding device of the display apparatus) can also be reduced. Accordingly, some embodiments indeed solve the problems that are desired to be solved in the art, and even provide a display apparatus (and a display holding device of the display apparatus) with a relatively lighter overall weight and a relatively larger image-display area.

Although the present disclosure is disclosed in the foregoing embodiments as above, it is not intended to limit the present disclosure. Any person who is familiar with the relevant art can make some changes and modifications without departing from the spirit and scope of the present disclosure. Therefore, the scope of the present disclosure shall be subject to the definition of the scope of patent application attached to the specification.

What is claimed is:

1. A display holding device comprising:
    a front frame comprising:
        an edge portion;
        a top portion connected to the edge portion;
        a containing portion having an opening toward the top portion, wherein an end of the containing portion is connected to the edge portion, and the containing portion is adapted to contain an optical transceiver module;
        an extending portion connected to an another end of the containing portion and extending toward a direction away from the edge portion, and the extending portion is adapted to contain a liquid crystal module; and
        a holding portion between the containing portion and the extending portion and adapted to contain a light-transmissive module so that an end of the light-transmissive module is between the opening and the top portion; and
    a rear plate connected to the front frame and adapted to contain an optical film module.

2. The display holding device according to claim 1, wherein the front frame further comprises a first protrusion connected to the edge portion and the extending portion, and the containing portion is formed by the first protrusion portion, the edge portion, the extending portion, and the holding portion together.

3. The display holding device according to claim 2, wherein the front frame further comprises a second protrusion connected to the edge portion, and the opening is formed by the second protrusion and the holding portion together.

4. The display holding device according to claim 1, further comprising an optical auxiliary element, the optical auxiliary element comprises a light-transmissive portion, and the light-transmissive portion is between the top portion and the holding portion.

5. The display holding device according to claim 4, wherein the optical auxiliary element further comprises a reflection portion, and the reflection portion corresponds to the optical transceiver module and the light-transmissive portion.

6. The display holding device according to claim 1, wherein the front frame further comprises a cushioning portion, and the cushioning portion is connected to the edge portion and corresponds to the light-transmissive module.

7. The display holding device according to claim 1, further comprising a rear frame connected to the front frame to fix the rear plate to the front frame.

8. The display holding device according to claim 1, wherein the edge portion, the top portion, the extending portion, and the holding portion are integrally formed as a one-piece member.

9. A display apparatus comprising:
    a light-transmissive module;
    an optical transceiver module;
    a liquid crystal module;
    an optical film module;

a front frame comprising:
  an edge portion;
  a top portion connected to the edge portion;
  a containing portion having an opening toward the top portion, wherein an end of the containing portion connected to the edge portion, and the containing portion contains the optical transceiver module;
  an extending portion connected to an another end of the containing portion and extending toward a direction away from the edge portion, wherein the extending portion contains the liquid crystal module; and
  a holding portion between the containing portion and the extending portion, wherein the holding portion contains the light-transmissive module so that an end of the light-transmissive module is between the opening and the top portion; and
a rear plate connected to the front frame, wherein the rear plate contains the optical film module.

10. The display apparatus according to claim 9, wherein the optical transceiver module has a main surface substantially parallel to the edge portion.

11. The display apparatus according to claim 10, wherein the optical transceiver module comprises a module body and an optical transceiver portion, the optical transceiver portion is on the module body and adapted to emit or receive a light, and the light is substantially perpendicular to the light-transmissive module.

12. The display apparatus according to claim 11, wherein the front frame further comprises a first protrusion connected to the edge portion and the extending portion, and the first protrusion portion, and the containing portion is formed by the edge portion, the extending portion, and the holding portion together.

13. The display apparatus according to claim 12, wherein the front frame further comprises a second protrusion connected to the edge portion, and the opening is formed by the second protrusion and the holding portion together.

14. The display apparatus according to claim 10, wherein the optical transceiver module comprises a module body and an optical transceiver portion, the optical transceiver portion is on the module body and adapted to emit or receive a light, and the light is substantially parallel to the light-transmissive module.

15. The display apparatus according to claim 14, wherein the front frame further comprises a first protrusion connected to the edge portion and the extending portion, and the containing portion is formed by the first protrusion portion, the edge portion, the extending portion, and the holding portion together.

16. The display apparatus according to claim 15, wherein the front frame further comprises a second protrusion connected to the edge portion, and the opening is formed by the second protrusion and the holding portion together.

17. The display apparatus according to claim 9, wherein the display holding device further comprises an optical auxiliary element comprising a light-transmissive portion, and the light-transmissive portion is between the top portion and the holding portion.

18. The display apparatus according to claim 17, wherein the optical auxiliary element further comprises a reflection portion, and the reflection portion corresponds to the optical transceiver module and the light-transmissive portion.

19. The display apparatus according to claim 9, wherein the front frame further comprises a cushioning portion, and the cushioning portion is connected to the edge portion and corresponds to the light-transmissive module.

20. The display apparatus according to claim 9, wherein the edge portion, the top portion, the extending portion, and the holding portion are integrally formed as a one-piece member.

* * * * *